Sept. 26, 1967  H. F. PLEMONS ET AL  3,343,818
PROCESS FOR MAKING GYPSUM BOARD
Filed June 14, 1966  2 Sheets-Sheet 1

Fig. I

INVENTORS
Henry F. Plemons
Marvin D.S. Fields

ATTORNEY

Sept. 26, 1967  H. F. PLEMONS ET AL  3,343,818
PROCESS FOR MAKING GYPSUM BOARD
Filed June 14, 1966  2 Sheets-Sheet 2

INVENTORS
Henry F. Plemons
Marvin D. S. Fields

ATTORNEY

United States Patent Office 3,343,818
Patented Sept. 26, 1967

3,343,818
PROCESS FOR MAKING GYPSUM BOARD
Henry F. Plemons and Marvin D. S. Fields, Medicine Lodge, Kans., assignors to National Gypsum Company, Buffalo, N.Y., a corporation of Delaware
Filed June 14, 1966, Ser. No. 557,524
2 Claims. (Cl. 259—147)

ABSTRACT OF THE DISCLOSURE

The method of making gypsum wallboard in which the effects of variations in any of several components is counteracted in the mixing of aqueous gypsum slurry, by the addition of an excess of foam, with its entrained air, to the variable speed mixer which is operated at a sufficiently excess speed to knock out the excess entrained air, providing a potential variability, by changing speed, of knocking out less or even more entrained air, to overcome the raw material variables.

---

This invention relates to the manufacture of paper-covered gypsum-core wallboard and is particularly directed to the preparation of the aqueous gypsum slurry which is formed and blended and subsequently disposed between two continuous paper webs and formed into suitable board form.

The preparation of the aqueous gypsum slurry consists essentially of a relatively brief agitation, in a mechanical mixer, of an admixture of calcined gypsum, water, an aerated soapy foam, a set accelerator, starch, and paper pulp. Other additives may also be employed. The relative proportions of each and the exact nature, quality, and purity of each will vary considerably from one manufacturing plant to another, and in any one plant it will vary from day to day and even from hour to hour or less.

It is with respect to the problem resulting from the hour-to-hour type of variation in ingredients that the present invention is particularly directed. Many different variables in the ingredients of the aqueous gypsum slurry can cause variations in the slurry and the manner in which it performs in the board-making process.

The purity of the ore used in the manufacture of the calcined gypsum often varies from one batch to the next by as much as 10%. For example, one batch of calcined gypsum ($CaSO_4 \cdot \frac{1}{2}H_2O$+impurities) may have been produced from ore which was 90% pure gypsum ($CaSO_4 \cdot 2H_2O$) and 10% impurities, while a next batch may be from 80% pure ore.

In addition to inconsistencies in the ore purity, the calcined gypsum may at times be somewhat under calcined, a situation wherein not all of the $CaSO_4 \cdot 2H_2O$ that was present in the ore undergoes the conversion to $CaSO_4 \cdot \frac{1}{2}H_2O$. On the other hand, it may be over calcined, in which case some of the $CaSO_4 \cdot 2H_2O$ is converted first to $CaSO_4 \cdot \frac{1}{2}H_2O$ and thence, by the excessive cooking, it is converted still further to $CaSO_4$. Further, both overburn and underburn can occur simultaneously. Still further, the degree and the uniformity of the fineness of the calcined gypsum, which is fed to the mixer as a dry powder, will cause substantial variations in the water requirement for reaction and in the efficiency and initiation of the setting reaction. Likewise, the length of time between the calcination of the gypsum and its addition to the mixer will result in a variation in the material temperature, and consequently its water requirement and efficiency of setting reaction.

The paper pulp, which is made from miscellaneous waste paper and which is added in a relatively minor porportion, will cause only slight variation as its characteristics vary. However, like the other smaller variables, they can all contribute to the overall problem. Other minor ingredients which can introduce a variable include starch, foaming agent and accelerator.

The starch can vary from variations in the raw material from which it is produced, from its age, from variations in the temperature at which it is cooked, and from variations in the enzyme action which occurs in it.

The foaming agents vary in the impurities present and the effect that the impurities have on the strength of the foam in accordance with their varying tendencies to react with the calcined gypsum in the slurry.

The accelerator, normally a ground set gypsum, will vary as a result of the occasional tendency of the abrasive, which grinds a block of the set gypsum to produce the ground form necessary for its use, to produce heat and calcine some of the material, whereby such calcined portion will tend to absorb more water when added to the slurry.

Another potential variable results from the fact that some gypsum board plants rely on city water for their water supply, and any variation in chlorine content will have a resultant variation in the performance of the gypsum slurry.

Finally, the paper, between which the gypsum slurry is disposed to form the wallboard core, can vary, such as in degree of sizing or inclination to absorb water from the calcined gypsum slurry.

These many variations can each individually, or, as groups, severally, cause a substantial variation from hour to hour in the water carrying capacity of the overall mixture. Consequently, the solids or the paper will vary in the degree to which they take up the water added, and a constant rate of water addition will result in variations in the volume of gypsum slurry formed.

The two most apparent approaches to solving the problem both create other substantial problems. First, to find the particular raw material variations that has caused each and every variation in the gypsum slurry formed can be very time consuming, and when found may be such that cannot be changed back, at least for a substantial period of time. Second, to increase or lower the rate of water addition to compensate for the water take-up characteristics of the solids, and to adjust the volume-rate of slurry being formed, will result in a number of new problems, including, as probably the most significant, the need to vary the drying conditions in the vast drying operation of the gypsum board plant to compensate for the different amount of water which must be dried therefrom. This type of change is definitely time consuming and expensive, requiring essentially a trial and error technique of adjustment, to avoid overdrying or underdrying.

The objects of this invention are to provide improved, reliable and simplified means for maintaining consistent quality production of gypsum wallboard without substantial concern, or detrimental effect, from the above-discussed many variables and to provide such at resultant overall reduced manufacturing costs.

These and other objects of the invention will be more readily apparent when considered in relation to the preferred embodiments of the invention as set forth in the specification and shown in the drawings in which.

Briefly, the present invention contemplates the incorporation of an excess of air-laden, soapy foam in the mechanical mixer for the gypsum slurry and providing means for any desirable increase or decrease in the speed of the agitating means in the mechanical mixer, whereby the mechanical mixer can be run at a mid-range speed determined as resulting in removing that amount of air from the foam added as would be normally "excess," but which speed can instantly be lowered to produce a slurry of greater than normal foam, or increased further to produce a slurry of less than normal foam.

Figure 1:
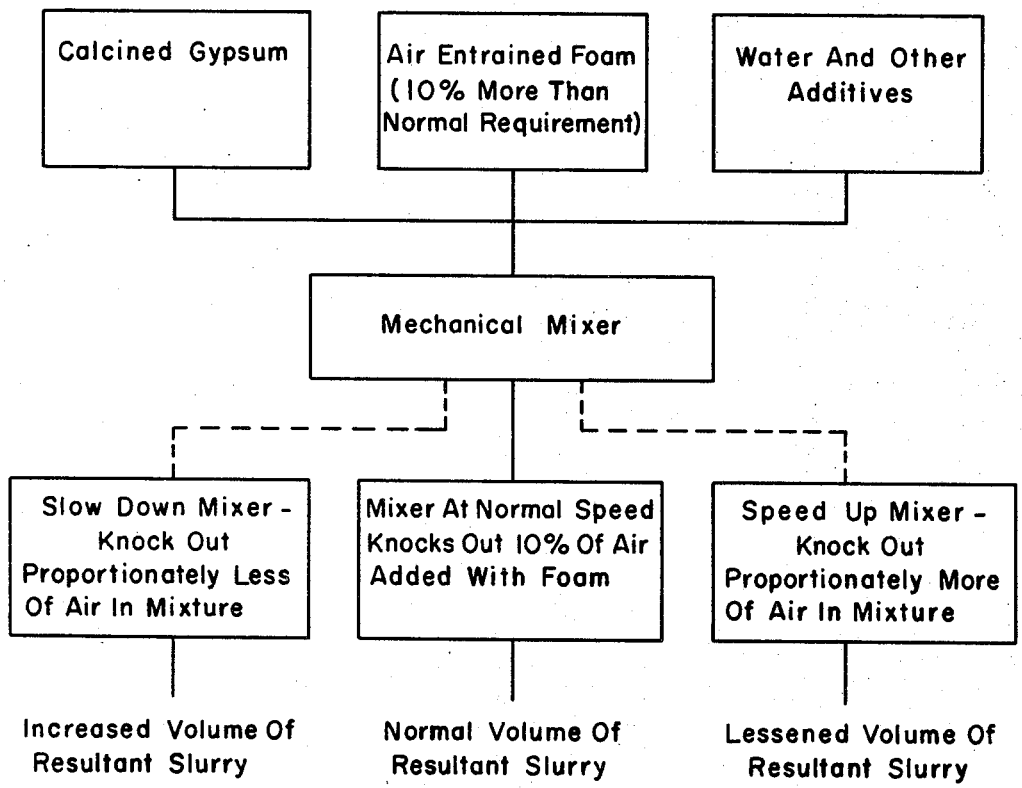
FIG. 1 is a flow diagram depicting the process steps of the present invention.
Figure 2:
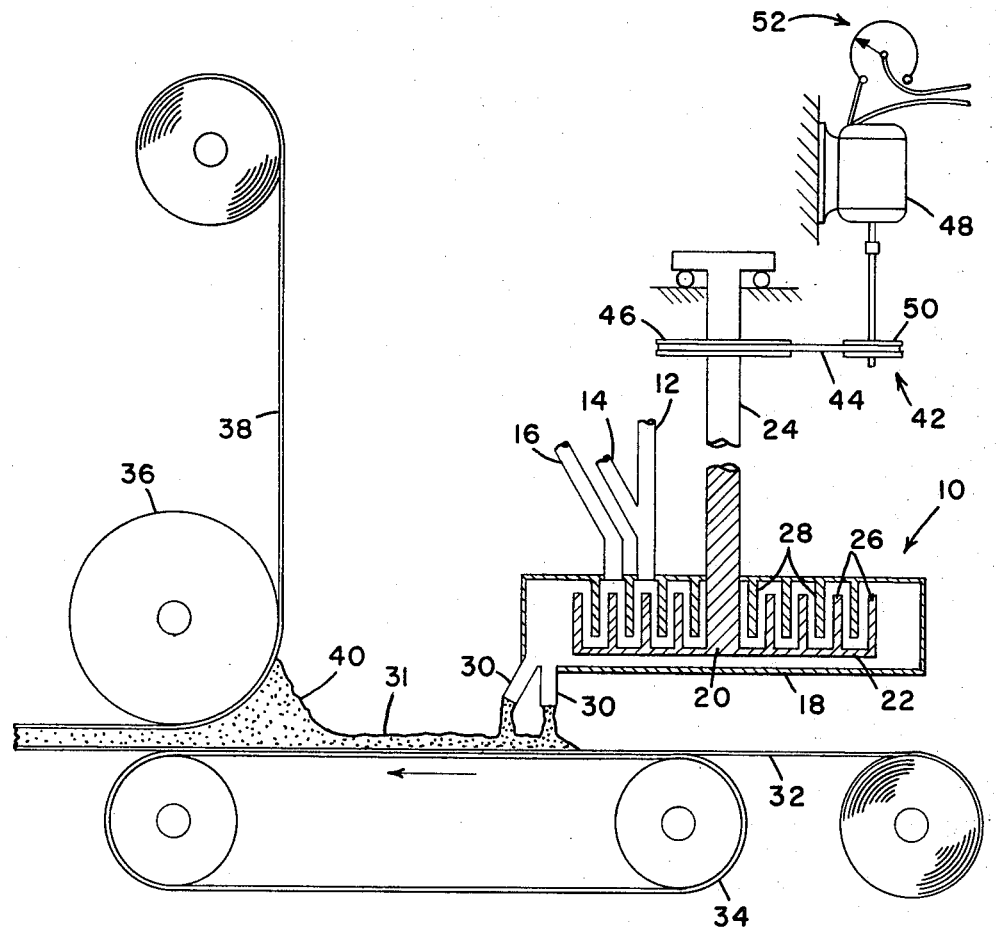
FIG. 2 is a diagrammatic cross-sectional view of the mixing and forming sections of a gypsum walboard machine, embodying the present invention.

Referring to the drawings, FIG. 1 is a flow chart depicting the several steps of the novel process. FIG. 2 is a diagrammatic view of the novel apparatus of the present invention. In each figure, there is reference to the well known addition of several ingredients essential in the manufacture of gypsum wallboard. In FIG. 2 there is shown whereat three streams of ingredients are fed to a pin mixer 10. These three streams of ingredients, or raw materials, include a first conduit 12 for feeding calcined gypsum, a second conduit 14 for feeding a supply of foam which consists of foaming agent, water and entrained air, and a third conduit 16 for feeding a slurry of water and the several other ingredients commonly used, in relatively minor quantities, such as paper pulp, starch and set accelerators.

The pin mixer 10 may be of any of the several known forms, as for example, those disclosed in Teale Patents 2,639,901 and 2,641,453 dated, respectively, May 26, 1953 and June 9, 1953. The pin mixers are a type of mechanical mixer developed to provide rapid, thorough mixing of the above common ingredients for the core of gypsum wallboard, without substantially separating the entrained air from the foam added. The foam that is added is for providing a fine cellular structure throughout the wallboard core, lowering the weight of the product an amount which can be tolerated without undue loss of strength and integrity.

In the form of pin mixer of FIG. 2, there is shown a generally cylindrical housing 18. Disposed therein is a rotor 20, including a bottom flat circular disc 22 and a central upwardly extending support and rotary drive shaft 24. Extending upwardly on the disc 22 are four annularly arranged groups of pins 26, and extending downwardly from the top of housing 18 are four annularly arranged groups of pins 28 intermeshing between pins 26. On one side of mixer 10, near the bottom, are three outlets 30 (two shown).

The thoroughly mixed gypsum slurry 31 is shown being continuously fed from the mixer 10 through outlets 30 from which it is deposited on the lower sheet of wallboard cover paper 32 which is being advanced on conveyor 34 towards a large forming roll 36. At the forming roll 36, an upper sheet of wallboard cover paper 38 is fed thereunder, atop the bank 40 of gypsum slurry which accumulates thereat, as measured amounts are continuously withdrawn therefrom between the upper and lower cover papers passing under the forming roll 36.

If none of the many variations existed in the raw materials and in their actions during steps of admixture, feed rates of all materials could be set to equal the measured amounts of gypsum slurry being withdrawn between the paper cover sheets at the forming roll 36. However, because of the many variations which do exist and occur in the raw materials and the preparation for use and in their use, many different things previously had to be continually observed, tested, adjusted, etc., in order to maintain a feed of slurry from the mixer 10 which kept the bank 40 of gypsum slurry of substantially constant size.

In accordance with the present invention, the drive means 42 for providing rotation of the rotor 20 of the mixer 10, through drive belt 44 and pulley 46, includes a drive motor 48 and drive pulley 50. The speed of the motor 48 is instantly variable within a substantial range of speeds, whereby the speed of rotation of the rotor 20 in the mixer 10 is equally instantly variable, by the presence of a rheostatic control 52 on the drive motor.

In a preferred embodiment, the drive motor is a 30 horsepower A.C. motor having a normal or rated speed of 700 r.p.m. With the rheostat control, the speed may be varied from 220 r.p.m. to 1180 r.p.m., however, in normal use in accordance with the invention, a variation in speed of only about 855 r.p.m. to 975 r.p.m. will be sufficient to maintain the bank 40 substantially constant.

The disc 22 of rotor 20 in the pin mixer of the embodiment shown is about 45 inches in diameter and the speed ratio of the rotor to the motor is about 1:3. Accordingly, the normal variation in the speed of the mixer rotor 20, in accordance with the invention, is about 285 r.p.m. to 325 r.p.m.

With a constant feed rate of the raw materials to the mixer 10, the weight of materials fed from the mixer to the lower paper cover sheet 32 also remains constant, even with the variation in the speed of the rotor 20 of the mixer 10. However, with an addition of raw materials in accordance with the invention, and a medium or normal speed of rotor 20 in accordance with the invention, a variation in the volume of gypsum slurry can be made instantly by an appropriate change in the rheostat control 52 of drive motor 48.

In mixing the calcined gypsum, water, and other additives with the prepared foam, which is essentially a great mass of very fine soap bubbles carrying air in a dispersed form into the core mixture, the foam is always destroyed to some slight degree and a part of the entrained air is lost. As is known in the art, any particular complete gypsum board machine has a mixer rotor speed at which a maximum amount of the entrained air can be retained while thoroughly mixing the slurry ingredients. This speed is referred to herein as the rotor speed of optimum foam efficiency.

In accordance with the invention, the process of making gypsum board includes establishing normal and preferred feed rates of the raw material to provide a volume of gypsum slurry at a rate equal to the rate such volume is being incorporated into board form between the upper and lower paper cover sheets 32, 38, with the mixer operating at a speed equal to from about 1% to 25% above the speed of optimum foam efficiency, and preferably from about 5% to 10% above the speed of optimum foam efficiency. At a mixer speed of 5% above the speed of optimum foam efficiency, about 10% of the entrained air that would have remained in the mixed slurry at optimum foam efficiency speed is now knocked out of the slurry by the mixer. Since this is the speed at which the mixer is kept as much as possible, an amount of foam is constantly fed to the mixer which at optimum foam efficiency speed would result in 10% more foam in the resultant slurry than is preferred.

The conveyor 34 and the paper cover sheets 32, 38 are advanced at a preferred constant speed, and the raw materials are fed to mixer 10 at preferred weight rates which, when all conditions are normal, results in the maintaining of a constant size bank 40 of slurry.

However, as discussed above in the opening portions, all conditions rarely remain normal even from hours to hour, and consequently with a variation in any one of the numerous possible variables, the size of the bank 40 changes undesirably. If the size of bank 40 decreases, the volume rate of slurry produced is rapidly increased by decreasing the speed of the mixer by as much as 5% of the speed, or, in other words, down to the speed of optimum foam efficiency. Conversely, if the size of bank 40 increases above normal, the volume rate of slurry produced is rapidly decreased by increasing the speed of the mixer, whereby even greater amounts of originally entrained air in the foam delivered to the mixer are knocked out of the gypsum slurry.

Many modifications in the process and apparatus of the invention will be readily apparent to one skilled in the art. The data given herein is largely by way of a preferred example and is subject to wide variations, as manufacturing conditions vary, without departing from

We claim:

1. The method of making paper-covered gypsum-core wallboard comprising the steps of feeding a substantially constant supply of calcined gypsum, fine tenacious foam, water, and other additives to a mechanical mixer having readily controllable variable speed mechanical mixing means, adjusting the speed of said mechanical mixing means to about 1% to 25% greater than the speed at which said ingredients are thoroughly mixed with an optimum retention of the entrained air of said foam, and adjusting the rate of addition of said foam to provide an amount of excess entrained air to equal the amount that will be knocked out by said speed being greater than the speed of optimum foam retention, whereby the volume of mixed materials may be varied by an inverse adjustment of said variable speed mechanical mixing means.

2. The method of claim 1 wherein said mixing means normal speed is about 5% to 10% above the speed for optimum foam retention, whereby increased volume of mixed materials can be obtained by a decrease in speed below said normal speed by an amount equal to said 5% to 10%, and decreased volume can be obtained by an increase of said speed above said normal speed.

References Cited

UNITED STATES PATENTS

| | | | |
|---|---|---|---|
| 2,639,901 | 5/1953 | Teale | 259—8 |
| 2,685,436 | 8/1954 | Hasselquist | 259—8 |
| 2,958,517 | 11/1960 | Harker et al. | 259—8 |

WILLIAM I. PRICE, *Primary Examiner.*

R. W. JENKINS, *Assistant Examiner.*